March 6, 1934. H. A. SCHELL 1,949,661
AUTOMATIC RETURN PASTE METER

Filed Oct. 22, 1932

Inventor
Harry A. Schell
By W. W. Williamson

Patented Mar. 6, 1934

1,949,661

UNITED STATES PATENT OFFICE 1,949,661

AUTOMATIC RETURN PASTE METER

Harry A. Schell, Philadelphia, Pa.

Application October 22, 1932, Serial No. 639,027

4 Claims. (Cl. 221—60)

My present invention relates to new and useful improvements in an automatic return paste meter, and has for its object to provide a simple, cheap and effective device of this class which will deliver a predetermined quantity of paste or the like from a collapsible tube or other container when sufficient pressure is exerted on the paste, and upon the release of said pressure the parts which have brought about the above results will be automatically returned to normal, preparatory to the delivery of a new charge.

Another object of the invention is to provide a stem carrying a valve for normally closing the outlet from the container, a flexible gasket which at certain times in the functioning of the device serves as a valve, said gasket having holes therethrough which holes are opened and closed at different steps in the process of a valve in the form of a washer sliding in upon the stem and the head of said stem.

A further object of the invention is to so construct the various parts that they may be readily assembled.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

In carrying out my invention as herein embodied, I provide a hollow valve stem 10 carrying the head or valve 11, and this stem is adapted to receive the stem 12 of the valve 13 and by forcing the stem 12 into the stem 10 with sufficient pressure, these parts will be firmly held together.

Figure 2:
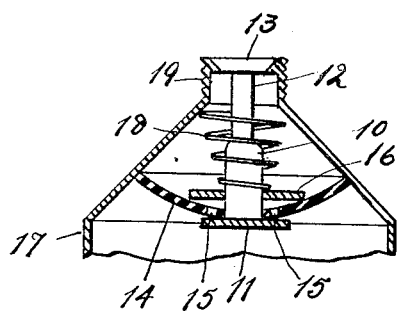
Fig. 2 is a view similar to Fig. 1, showing the parts of my invention in the positions assumed when pressure has been exerted upon the contents within the container.

14 represents a flexible gasket valve, preferably made of rubber, leather or like material, and having a suitable hole through the center thereof for the passage of the stem 10; this gasket is also provided with the holes 15 so positioned that these holes will be closed when the gasket lies flat upon the valve 11, but will be open when the gasket is bowed as shown in Fig. 2.

16 represents a washer valve fitted to freely slide upon the stem 10 and is of such diameter that it also overlaps the holes 15 in the same manner that the valve 11 overlaps said holes, and this washer is preferably of fibre or other stiff material which will not flex, but readily ride up and down on the stem 10.

The device is assembled in the container 17 by simply placing the gasket 14, the washer 16 and the spring 18 upon the stem 10 and inserting said stem through the mouth 19 of the container and finally forcing the stem 12 into the stem 10 with sufficient force to prevent its accidental withdrawal when all the parts will be held in proper relation and the device set for functioning.

Figure 1:
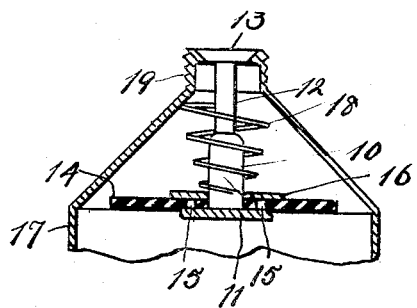
Fig. 1 is a section of the upper portion of a container, such as a collapsible tube showing my invention in connection therewith.

The normal position of the device is shown in Fig. 1, in which the valve 13 is seated upon the mouth 19 by the spring 18, thereby securely closing the container and avoiding the necessity of using a screw top as a closure.

When it is desired to deliver a charge of paste from the container, it is only necessary to exert sufficient pressure upon the flexible walls of the container to force the paste upward into the conical top of said container, which action will first flex the gasket 14 by the flow of the paste partly filling the space above said gasket and finally bringing the edges of said gasket into firm contact with the conical walls. It being understood that the pressure of the spring 18 on the center of the gasket holds that portion of the gasket against upward movement while its edges are being flexed, as just described.

During the flexing of the gasket, the holes 15 will be lifted from off the valve 11 and the valve 16 will be lifted, all of which is clearly shown in Fig. 2, thus permitting additional paste to be forced through said holes so as to complete the filling of the delivery space, or that portion of the interior of the conical top above the gasket.

Figure 3:
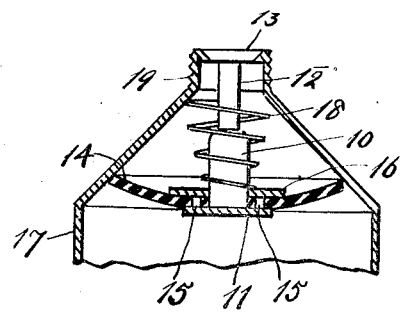
Fig. 3 is a view similar to Fig. 2, showing the position of the parts of my device assumed when the delivery space has been filled.
Figure 4:
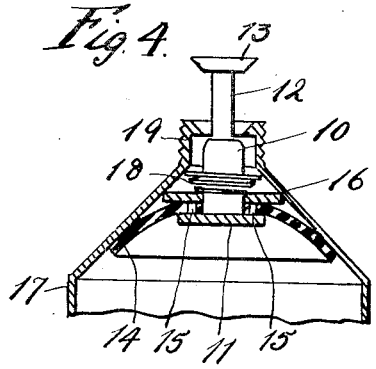
Fig. 4 is a view similar to Fig. 3, showing the parts in position just after a charge of paste has been expelled.
Figure 5:
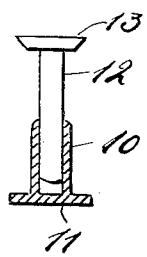
Fig. 5 is a detail section of the valve stems.

When the discharge space has been completely filled by the flow of paste through the holes 15, the pressure above the gasket will be equalized with the pressure below the gasket, thus permitting the spring 18 to flatten the central portion of the gasket valve 14 between the valves 11 and 16, as shown in Fig. 3, so that thereafter any further pressure exerted upon the paste below the gasket will force the stems 10 and 12 and the parts carried thereby upward into the position shown in Fig. 4, as a single unit, thus lifting the valve 13 from off the mouth of the container and permitting the outflow of the paste from the delivery space until the valve disc 16 seats against the conical walls of the container, thereby preventing forward upward movement of these parts and cutting off the outflow of the paste.

By simply releasing the pressure from the contents of the container, the spring will be permitted to force all the parts of the device downward, disengaging the edges of the flexible gasket from the walls of the conical top, and return the parts to the position shown in Fig. 1, which is the normal position of the device. Successive charges of the paste may be delivered by repeating the operation of exerting sufficient pressure upon the paste within the container to bring about the movements before described.

By the application of my improved device to collapsible tubes and the like, a measured charge may be delivered by simply pressing upon the collapsible walls of the tube and such charges may be successively delivered, each of said charges being the same quantity without care or thought on the part of the operator.

While the gasket may be of leather or rubber, other flexible materials might be used, and I therefore do not wish to be limited to the exact details of construction herein shown and described as these may be varied within the limits of the appended claims without departing from the spirit of my invention.

Having thus fully described my invention, what I claim as new and useful is:—

1. An automatic return paste meter, comprising a container, a valve for seating over the mouth of said container, a stem projecting downward from the valve, a second valve carried upon the lower end of the stem, a flexible gasket seated upon the second named valve, a washer valve slidably mounted upon said stem and fitted over the gasket, said gasket having delivery holes therethrough, said holes lying beneath the washer valve so as to be closed thereby and a spring for forcing the stem inward.

2. In a device of the character described, a flexible gasket having delivery holes therethrough, a stem passing through the center of said gasket, a head formed on the stem, said head serving to close the delivery holes in the gasket when the latter is flattened, a washer valve slidably mounted upon the stem and also adapted to close the delivery holes through the gasket when pressed thereagainst, a valve carried by the stem for closing the mouth of the container, and a spring coiled about said stem adapted to yield and permit the outward movement of the stem carried thereby and adapted to force said parts inward to restore them to their normal positions.

3. In a device of the character described, a hollow stem having a head serving as a valve, a second stem serving as a valve, the last named stem being secured to the first named stem by being forced into the latter, a flexible gasket mounted on the first named stem so as to seat against the head thereof, said gasket having delivery holes therethrough adapted to be closed by said head, a washer valve seated upon the upper surface of the gasket and also adapted to close the delivery holes therethrough, said parts being adapted to be placed within a container, a spring for forcing one of said valves against the mouth of the container and for yieldingly holding all of the parts of the device in their normal position.

4. In a device of the character described, a container having a tapered end provided with an outlet, a valve stem structure slidably mounted in the inlet and having a valve at each end thereof, one of said valves controlling said outlet, the other valve comprising a flexible valve member mounted on said stem structure and having apertures therethrough controlled partially by the other valve on said valve stem structure, said flexible valve member normally being out of engagement with the walls of the container but capable of being flexed outwardly to cause the edges thereof to engage the tapered end to separate the outer portion of said tapered end from the balance of the container, and a washer valve slidably mounted on the valve stem structure and coacting with the flexible valve member to also control the apertures through said flexible valve member, the outward flexion of said flexible valve member moving the washer valve in one direction, and means to cause said washer valve to move in the opposite direction to cause said washer valve to close the apertures in the flexible valve member whereby internal pressure will move all of the parts and cause the central portion of the flexible valve member to flex outward beyond its perimeter, said last named means returning all of the parts to their normal positions upon the discontinuance of the internal pressure.

HARRY A. SCHELL.